United States Patent [19]
Asakura

[11] Patent Number: 4,463,596
[45] Date of Patent: Aug. 7, 1984

[54] KNOCK SENSOR FOR COMBUSTION ENGINES

[75] Inventor: Masamitsu Asakura, Katsuta, Japan

[73] Assignee: Hitachi, Ltd., Tokyo, Japan

[21] Appl. No.: 338,865

[22] Filed: Jan. 12, 1982

[30] Foreign Application Priority Data

Jan. 21, 1981 [JP] Japan ............................. 56-6335

[51] Int. Cl.³ ............................................. G01L 23/22
[52] U.S. Cl. ........................................ 73/35; 310/329
[58] Field of Search .......................... 73/35, 652, 654; 310/321, 323, 325, 329

[56] References Cited

U.S. PATENT DOCUMENTS

| | | |
|---|---|---|
| 2,808,522 | 10/1957 | Dranetz . |
| 3,120,622 | 2/1964 | Dranetz et al. ................. 73/652 |
| 3,252,016 | 5/1966 | Hayer ............................. 310/329 |
| 4,373,378 | 2/1983 | Fujishiro ......................... 73/35 |

*Primary Examiner*—S. Clement Swisher
*Attorney, Agent, or Firm*—Antonelli, Terry & Wands

[57] ABSTRACT

A housing is mounted on the body of an internal combustion engine to vibrate together therewith. The housing contains a weight that is constructed as a unitary structure together with a vibration unit which has such a rigidity as to resonate at knocking frequencies of the internal combustion engine, and a converter element which converts the pressure received from the weight into electric signals.

9 Claims, 8 Drawing Figures

KNOCK SENSOR FOR COMBUSTION ENGINES

BACKGROUND OF THE INVENTION

The present invention relates to a piezo-electric knock sensor for sensing knocking of internal combustion engines.

According to the conventional piezo-electric knock sensor, vibration caused by the knocking of the internal combustion engine is detected by transmitting the vibration of a weight to a piezo-electric element via a spring which resonates at a knocking frequency of the internal combustion engine and which is separately provided from the weight. The above knock sensor has been disclosed, for example, in FIG. 1 of Japanese Patent Laid-Open No. 19978/1980.

In the conventional piezo-electric knock sensor, however, since vibration of weight provided separately from the spring is transmitted to the piezo-electric element via the spring as mentioned above, it is difficult to compactly design the device which resonates only at such high frequencies of about 7 to 8 KHz that are equal to knocking frequencies of the internal combustion engines.

SUMMARY OF THE INVENTION

The object of the present invention is to obtain a compactly constructed piezo-electric knock sensor which is capable of resonating at relatively high particular frequencies.

In order to achieve the above-mentioned object according to the present invention, a vibration portion of a rigidity which resonates at knocking frequencies of an internal combustion engine is provided in a weight that requires a predetermined size to drive the piezo-electric element, and the knocking frequency detected by the vibration portion of weight is transmitted to the piezo-electric element through the weight. Therefore, it is possible to obtain a compact knock sensor which resonates at relatively high particular frequencies same as the knocking frequencies of the internal combustion engine, to detect the knocking of the internal combustion engine.

DESCRIPTION OF THE PREFERRED EMBODIMENTS

Figure 1:
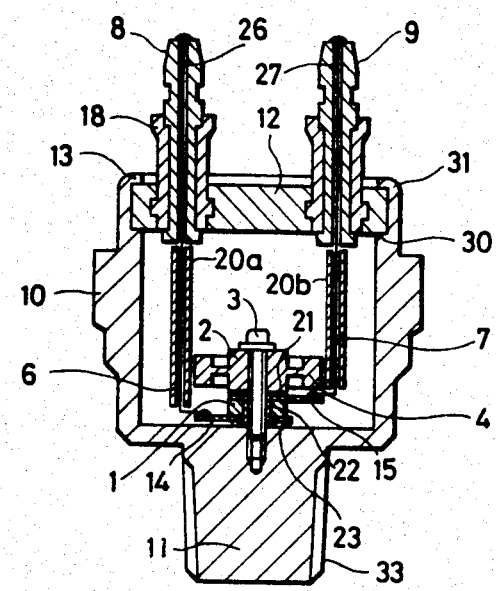
FIG. 1 is a section view of a knock sensor according to an embodiment of the present invention, in which a vibration portion and a weight that are formed as a unitary structure are mounted on the bottom of a cylindrical housing in such a manner that the vibration portion is allowed to freely move.

Referring to FIG. 1, the periphery of a boss 11 of a cylinder 10 is threaded as designated at 33 so that the cylinder 10 can be secured to the body of an internal combustion engine. A piezo-electric element 1 and a weight 2 are mounted on the bottom of the cylinder 10.

Figure 2A:
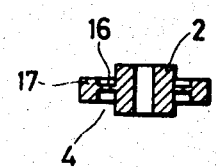
FIGS. 2A, 2B, and 2C shows in cross section modified examples of the weight having the vibration portion shown in FIG. 1.
Figure 2B:
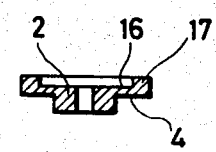
Figure 2C:
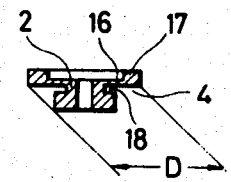

The weight 2 and a vibration portion 4 are formed as a unitary structure. The weight 2 is illustrated in FIGS. 2A, 2B and 2C. The vibration portion 4 consists of a thin flange portion 16 which is formed around the periphery of the cylindrical weight 2 and which is in parallel with the bottom of the cylinder 10, and a thick ring portion 17 that is joined to the thin flange portion 16. Here, the thin flange portion 16 is in parallel with the bottom of the cylinder 10. The thin flange portion 16 and the thick ring portion 17 will be so formed as to resonate at knocking frequencies of the internal combustion engine relying upon the designing means that will be mentioned later. The voltage produced by the piezo-electric element is fed to lead wires 6, 7 via electrode plates 14, 15.

The resonance frequency f of the vibration portion 4 is given by the following relation, $$f = \frac{1}{2\pi} \sqrt{\frac{K}{m}} \tag{1}$$

where K denotes a spring constant of the flange portion 16 of the vibration portion, and m denotes a mass of the weight of the vibration portion 4.

The above values K and m are determined by the shapes, sizes and material of the thin flange portion 16 and thick ring portion 17 of the vibration portion 4. By suitably setting these values, therefore, the vibration portion having any desired resonance frequency can be produced.

The piezo-electric element 1, weight 2, screw 3, insulating materials 21, 22, 23, and electrode plates 14, 15 overlapped with the piezo-electric element 1, as a whole, serve as a weight for imparting pressure to the piezo-electric element 1 when knocking has developed. The electric output of the piezo-electric element 1 is fed to terminals 8 and 9 via lead wires 6, 7. When the cylinder, i.e., outer shell 10 is made of a metal, the piezo-electric element is insulated by insulating materials 21, 22 and 23. When the outer shell 10 is made of a metal, the terminals 8 and 9 penetrate through a metal cover 12 mounted on the upper surface of the outer shell 10 and extend into the outer shell 10. Through holes 26, 27 are formed in the terminals 8 and 9, such that the lead wires can be drawn. The terminals 8, 9 are molded into the metal cover 12 with an insulating resin 18. A tip 13 of a cylindrical portion 31 of the outer shell 10 is inwardly folded to fasten the bottom surface of the cover 12 to a stepped portion 30 of the outer shell 10. The cover 12 and the terminals 8, 9 have been formed as a unitary structure before they are fastened to the stepped portion 30. Lead wires 6, 7 connected to the terminals 14, 15 are drawn through the holes 26, 27 of the terminals 8, 9 before the metal cover 12 is tightened. Reference numerals 20a, 20b denote insulating films covering the lead wires.

FIG. 2B illustrates a weight equipped with the vibration portion 4 of a shape different from that of the embodiment of FIG. 2A. In FIG. 2A, the flange portion 16 couples the outer central portion of the cylindrical weight 2 to the inner central portion of the thick ring portion 17 in parallel with the bottom surface of the cylinder 10. In FIG. 2B, on the other hand, the flange portion couples the upper end of the cylindrical weight 2 to the lower end of the thick ring portion 17 in parallel with the bottom surface of the cylinder 10. The weight 2 having vibration portion 4 shown in FIG. 2B works in the same manner as that of FIG. 2A. The weight 2 of FIG. 2B, however, has a simple shape, and can be easily manufactured compared with that of FIG. 2A.

FIG. 2C illustrates the weight having vibration portion 4 of a further different shape. A ring-like notch 18 is formed in the portion where the weight 2 and the thin flange portion 16 are connected together. Compared with the weights without notch of FIGS. 2A and 2B, therefore, the outer diameter D of the vibration portion 4 can be reduced.

Figure 3:
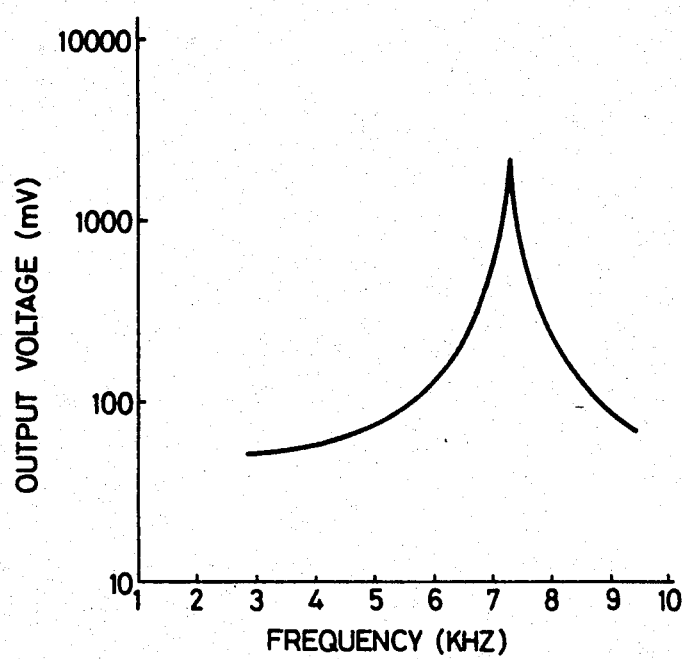
FIG. 3 is a graph showing the frequency characteristics of the knock sensor of FIG. 1.

FIG. 3 shows frequency characteristics measured by using the knock sensor of FIG. 1 having an impedance of 1 megohms and a measuring instrument having an impedance of 1 megohms at a temperature of 25° C. under the acceleration of 5G. Usually, knocking frequencies of internal combustion engines lie from 7 to 8 MHz. The knock sensor of the present invention exhibits a peak value at knocking frequencies. Therefore, when installed on an internal to vibrations other than the knocking vibrations, but produces a signal voltage responsive to the knocking frequencies highly sensitively. In other words, the knock sensor of the present invention detects the knocking highly sensitively without the need of incorporating a band-pass filter. Furthermore, with the knock sensor of the present invention, the vibration portion is formed together with the weight as a unitary structure in the casing 10. Accordingly, the knock sensor of the present invention is constructed in a compact size. When the knock sensor shown in FIG. 1 of the above-mentioned Japanese Patent Laid-Open No. 19979/80 is so constructed as to satisfy the relation (1), the vibration portion must be formed by a spring separate from the weight, which is different from the vibration portion 4 of the present invention which is constituted by a metal (such as steel) having the same rigidity as the weight. According to the art of the above Japanese Patent Laid-Open No. 19979/80, therefore, it is not possible to compactly form the vibration portion which has a large rigidity to resonate at relatively high resonance frequencies of about 7 to 8 KHz. With the conventional knock sensor, therefore, the peak value is obtained at such a relatively low frequency as about 1 KHz; the knock sensor resonates at knocking frequencies of 7 to 8 KHz only through the use of a band-pass filter.

Figure 4:
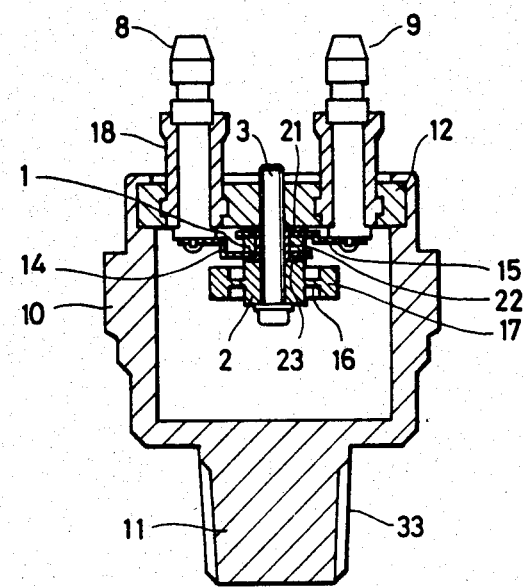
FIG. 4 is a section view showing a portion of the knock sensor according to another embodiment of the present invention, in which the weight having vibration portion is secured to the back surface of a cover of the cylindrical housing in such a manner that the vibration portion is allowed to freely move.

In the knock sensor shown in FIG. 1, the weight 2 having vibration portion 4 and the piezo-electric element are mounted on the bottom of the cylinder 10, whereas in the knock sensor shown in FIG. 4, the weight 2 having vibration portion 4 and the piezo-electric element 1 are mounted on the back surface of the cover 12 of the cylinder 10. In FIG. 4, the same reference numerals as those of FIG. 1 denote the members same as those of FIG. 1.

According to the embodiment of FIG. 4, the cover 12 is secured to the outer shell 10. Therefore, vibration transmitted from the internal combustion engine to the outer shell 10 is directly transmitted to the cover 12, whereby the knocking developed in the internal combustion engine is secured in the same manner as the knock sensor of FIG. 1. Moreover, since the electrode plates 14, 15 are directly connected to the terminals 8, 9 there are required no lead wires 6, 7 or no insulating coatings 20a, 20b for covering the lead wires 6, 7 which are shown in FIG. 1. Accordingly, the number of parts is reduced, and the operation for assembling the knock sensors is simplified, correspondingly.

Figure 5:
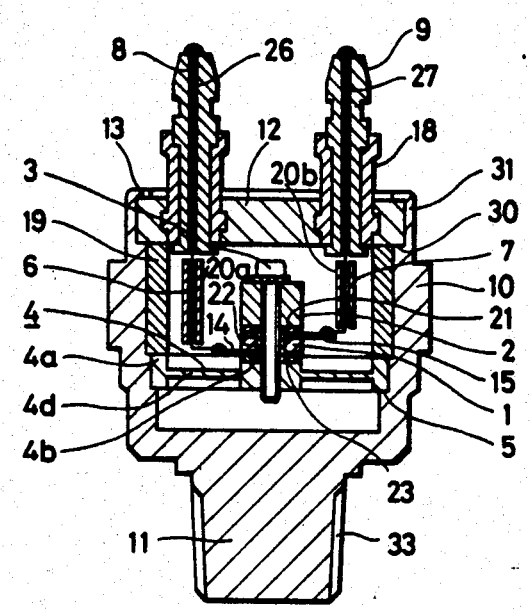
FIG. 5 is a section view of the knock sensor according to a further embodiment of the present invention, in which the vibration portion is secured to the inner wall of the cylindrical housing.
Figure 6:
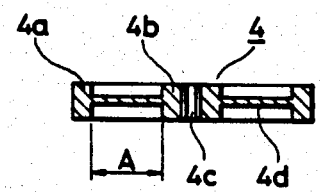
FIG. 6 is a section view showing the vibration portion of FIG. 5 on an enlarged scale.

In the knock sensors shown in FIGS. 1 and 4, the thick ring portion 17 of the vibration portion 4 does not come into contact with the inner side wall of the cylinder 10 but remains in a free condition. In the knock sensor of FIg. 5, on the other hand, the thick ring portion of the vibration portion is secured onto the inner side wall of the cylinder 10. In FIG. 5, the same reference numerals as those of FIGS. 1 and 4 denote the same members as those of FIGS. 1 and 4. The knock sensor shown in FIG. 5 will be described below.

The metallic casing 10 is formed in the shape of a cylinder having bottom, and a boss 11 is formed in the bottom. The periphery of the boss 11 is threaded as designated at 33 so that the casing 10 can be secured to the body of the internal combustion engine.

An annular step 5 is formed in the inner peripheral edge of the casing 10 at a position above the bottom of the casing by a predetermined distance.

The circumference of the metal disc 4 is fitted into the inner peripheral surface of the casing 10, and the bottom of a thick portion 4a formed around the periphery is brought into contact with the stepped portion 5. The metal disc 4 has a thick portion 4b at the center, and has a screw hole 4c at the center of the thick portion 4b. A thin annular portion 4d having a predetermined rigidity is formed between the thick portion 4a and the thick portion 4b in parallel with the bottom of the casing 10.

The piezo-electric element 1 is placed on the thick portion 4b of the metal disc 4 via an insulating plate 23 and a terminal plate 22. Screw holes are formed in the piezo-electric element 1, in the insulating plate 23 and in the terminal plate 22 to correspond to the screw hole 4c. The weight 2 is placed on the piezo-electric element 1 via terminal plate 15 and insulating plate 21. The weight 2, terminal plate 15 and insulating plate 21 have a screw hole that corresponds to the screw hole 5c. The insulating ring 22 is provided between the piezo-electric element 1 and the screw 3. The screw 3 is screwed into the weight 2, insulating plate 21, terminal plate 15, piezo-electric element, insulating ring 22, terminal plate 22, insulating plate 23 and thick portion 4b and acts as a means for holding them together while exerting a predetermined load. The metal plate 4 is fitted into the inner periphery of the casing 10 after the metal plate 4, piezo-electric element 1, and weight 2 are held by the screw.

The lower surface of the metal cylinder 19 comes into contact with the upper surface of the thick portion 4a of the metal plate 4. Both the metal cylinder 19 and the metal plate 4 can be fitted to the casing 10, simultaneously. A stepped portion 30 is formed in the inner peripheral surface of the casing 10 to oppose to the upper end of the metal cylinder 19. A cylindrical portion 31 having a relatively small thickness stretches above the stepped portion 30 of the casing 10.

The metal cover 12 is placed on the upper end of the metal cylinder 19. The tip 13 of the upper cylindrical portion 31 of the casing 10 is inwardly folded, so that the bottom surface of the cover 12 is secured onto the stepped portion 30 of the casing 10. In this case, the metal cylinder 19 is downwardly pressed, and its lower end secures the thick portion 4a of the metal disc 4 onto the stepped portion 5.

The thin portion 4d of the metal disc 4, thick portion 4b, weight 21, screw 3, piezo-electric element 1, and insulating materials 21, 22 and 23 constitute, at the center of the metal plate 4, a free vibration system having a mass m which is taken into consideration in the aforementioned relation (1). Therefore, the rigidity K can be changed by changing the thickness of the thin portion 4d or the width A of the thin portion 4d, and the mass m can be changed by changing the above-mentioned resultant mass. The weight for giving pressure to the piezo-electric element 1 is the same as that of FIG. 1.

As will be obvious from the above relation (1), therefore, the knock sensor which responds to the knocking frequencies of 7 to 8 KHz of internal combustion engines can be easily realized by reducing the resultant mass, and by fitting the thick portion 4a of the metal plate 4 to the inner peripheral portion of the cylinder 10 to increase the rigidity.

In the embodiment of FIG. 5, furthermore, the piezo-electric element 1 is secured onto the thick portion at the center 4b of the metal disc 4. Therefore, the piezo-electric element 1 is not broken even when bending stress is exerted on the metal disc 4.

Moreover, since the piezo-electric element 1 itself serves as a weight, the weight 2 can be eliminated, depending upon the cases.

What is claimed is:

1. In a knock sensor for an internal combustion engine comprising:
    a housing mounted on a body of an internal combustion engine;
    a vibration portion which is accommodated in said housing and which has a vibration unit that resonates at a knocking frequency of the internal combustion engine;
    a converter element which converts a compression force into electric signals; and
    a force which is generated at said vibration unit to said converter element as a compression force, wherein said vibration unit consists of a thin flange portion formed around the periphery of said weight and a thick ring portion formed around said thin flange portion.

2. A knock sensor for an internal combustion engine according to claim 1, wherein the outer periphery of said ring-like thick portion remains in a free condition relative to the inner wall of said housing.

3. A knock sensor for an internal combustion engine according to claim 1, wherein the outer periphery of said ring-like thick portion is secured to the inner wall of said housing.

4. A knock sensor for an internal combustion engine according to claim 1, wherein said vibration portion is constructed by of the same metal member as said weight as a unitary structure, and said thin portion and said thick portion are formed nearly in flush with each other.

5. A knock sensor for an internal combustion engine comprising:
    a cylindrical housing which is mounted on the body of an internal combustion engine, and which vibrates together with the body of the internal combustion engine;
    a piezo-electric element which is placed on the bottom on the inner side of said housing;
    a weight placed on said piezo-electric element;
    a vibration portion which is constructed together with said weight as a unitary structure, and which is made of the same metal material as said weight that consists of a thin flange portion formed around the outer circumference thereof and a thick ring portion formed around the outer circumference of said thin flange portion nearly in parallel with the bottom surface of said housing;
    a screw for fastening said weight and said element onto the bottom surface on the inner side of said housing with a predetermined fastening force; and
    means for taking out the output of said piezo-electric element from said housing.

6. A knock sensor for an internal combustion engine comprising:
    a cylindrical housing which is mounted on the body of an internal combustion engine, which vibrates together with the body of the internal combustion engine, and which forms a stepped portion in the inner peripheral edge of the housing;
    a vibration portion which is fastened at its outer periphery to said stepped portion, and which consists of a rigid metal plate forming a thick portion at the center thereof;
    a piezo-electric element placed on said thick portion;
    a weight placed on said piezo-electric element;
    a screw for fastening said piezo-electric element and said weight to said thick portion with a predetermined fastening force; and
    means for taking out the output of said piezo-electric element from said housing.

7. In a knock sensor for an internal combustion engine comprising:
    a housing mounted on a body of an internal combustion engine;
    a vibration portion which is accommodated in said housing and which has a vibration unit that resonates at a knocking frequency of the internal combustion engine;
    a converter element which converts a compression force into electric signals; and
    a weight that transmits a force which is generated at said vibration unit to said converter element as a compression force;
    wherein said vibration portion is secured to said housing, and further comprising means for holding said weight and said converter element together while exerting a predetermined load, said means for holding comprising a fastener for securing said weight and said converter to said vibration portion with the converter situated between the weight and the vibration portion.

8. A knock sensor according to claim 7, wherein the vibration portion comprises a disk-shaped member that is secured to the housing at its periphery.

9. A knock sensor according to claim 7, wherein said fastener comprises a screw passing through said weight and said converter element.

* * * * *